(12) United States Patent
Ahn et al.

(10) Patent No.: US 8,351,392 B2
(45) Date of Patent: *Jan. 8, 2013

(54) METHOD FOR ACQUIRING RESOURCE REGION INFORMATION FOR PHICH AND METHOD OF RECEIVING PDCCH

(75) Inventors: Joon Kui Ahn, Seoul (KR); Bong Hoe Kim, Seoul (KR); Young Woo Yun, Gyeonggi-do (KR); Ki Jun Kim, Seoul (KR); Jung Hoon Lee, Seoul (KR); Dae Won Lee, Seoul (KR); Dong Youn Seo, Seoul (KR); Dong Wook Roh, Seoul (KR); Suk Hyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,416

(22) Filed: Jul. 11, 2011

(65) Prior Publication Data

US 2011/0268078 A1      Nov. 3, 2011

Related U.S. Application Data

(63) Continuation of application No. 12/526,499, filed as application No. PCT/KR2008/004754 on Aug. 14, 2008.

(60) Provisional application No. 60/955,863, filed on Aug. 14, 2007.

(30) Foreign Application Priority Data

Aug. 14, 2008  (KR) .................. 10-2008-0079740

(51) Int. Cl.
    *H04L 27/28*      (2006.01)

(52) U.S. Cl. ...................................... 370/329; 370/344
(58) Field of Classification Search ............ 370/329, 370/344

See application file for complete search history.

(56) References Cited

U.S. PATENT DOCUMENTS

| 5,175,867 | A  | 12/1992 | Wejke et al. |
| 6,359,923 | B1 | 3/2002  | Agee et al.  |

(Continued)

FOREIGN PATENT DOCUMENTS

EP    1175022    1/2002

(Continued)

OTHER PUBLICATIONS

"LS on physical channel definition," R1-073231, 3GPP TSG RAN WG1 Meeting #49bis, Jun. 2007.

(Continued)

*Primary Examiner* — Lester Kincaid
*Assistant Examiner* — Steven Kelley
(74) *Attorney, Agent, or Firm* — Lee, Hong, Degerman, Kang & Waimey

(57) ABSTRACT

A method of acquiring information on a resource region for transmitting PHICH and a method of receiving PDCCH using the same are disclosed. The resource region for transmitting the PHICH can be specified by first information corresponding to the per-subframe PHICH number and second information corresponding to a duration of the PHICH within the subframe. The first information can be specified into a form resulting from multiplying a predetermined basic number by a specific constant. And, the specific constant can be transmitted via PBCH. Moreover, the second information can be acquired from the PBCH as well.

6 Claims, 6 Drawing Sheets

U.S. PATENT DOCUMENTS

| | | | |
|---|---|---|---|
| 6,480,522 B1 | 11/2002 | Hoole et al. | |
| 6,621,851 B1 | 9/2003 | Agee et al. | |
| 6,628,956 B2 | 9/2003 | Bark et al. | |
| 6,804,307 B1 | 10/2004 | Popovic | |
| 6,873,606 B2 | 3/2005 | Agrawal et al. | |
| 7,106,781 B2 | 9/2006 | Agee et al. | |
| 7,149,238 B2 | 12/2006 | Agee et al. | |
| 7,197,281 B2 | 3/2007 | Pietraski et al. | |
| 7,430,244 B2 | 9/2008 | Chung et al. | |
| 7,433,347 B1 | 10/2008 | Trott et al. | |
| 7,469,015 B2 | 12/2008 | Le Nir et al. | |
| 7,577,085 B1 | 8/2009 | Narasimhan | |
| 7,623,441 B1 | 11/2009 | Sampath et al. | |
| 7,675,886 B2 | 3/2010 | Agrawal et al. | |
| 7,720,168 B2 | 5/2010 | Su et al. | |
| 7,724,639 B1 | 5/2010 | Porat et al. | |
| 7,724,838 B2 | 5/2010 | Mantravadi | |
| 7,773,685 B2 | 8/2010 | Tirkkonen et al. | |
| 7,852,806 B2* | 12/2010 | Ahn et al. | 370/329 |
| 7,869,402 B2* | 1/2011 | Yoon et al. | 370/329 |
| 7,881,222 B2* | 2/2011 | Lee et al. | 370/252 |
| 7,889,633 B2 | 2/2011 | Noh et al. | |
| 7,894,330 B2* | 2/2011 | Lee et al. | 370/208 |
| 7,920,638 B2 | 4/2011 | Le Nir et al. | |
| 7,929,563 B2 | 4/2011 | Wang et al. | |
| 7,991,063 B2 | 8/2011 | Khan et al. | |
| 8,014,769 B2* | 9/2011 | Lee et al. | 455/422.1 |
| 8,019,332 B2* | 9/2011 | Lee et al. | 455/422.1 |
| 8,027,297 B2* | 9/2011 | Kim et al. | 370/329 |
| 8,031,668 B2* | 10/2011 | Wang et al. | 370/329 |
| 8,036,197 B2 | 10/2011 | Pajukoski et al. | |
| 8,041,362 B2 | 10/2011 | Li et al. | |
| 8,050,227 B2* | 11/2011 | Lee et al. | 370/329 |
| 8,116,271 B2* | 2/2012 | Pi | 370/329 |
| 8,155,069 B2* | 4/2012 | Chun et al. | 370/329 |
| 2003/0067907 A1 | 4/2003 | Rezaiifar et al. | |
| 2003/0185159 A1 | 10/2003 | Seo et al. | |
| 2004/0058687 A1 | 3/2004 | Kim et al. | |
| 2004/0257978 A1 | 12/2004 | Shao et al. | |
| 2005/0068918 A1 | 3/2005 | Mantravadi et al. | |
| 2005/0157680 A1 | 7/2005 | Zhang et al. | |
| 2005/0180328 A1 | 8/2005 | Kim et al. | |
| 2005/0250540 A1 | 11/2005 | Ishii et al. | |
| 2005/0265250 A1 | 12/2005 | Gollamudi et al. | |
| 2006/0018259 A1 | 1/2006 | Kadous | |
| 2006/0023745 A1 | 2/2006 | Koo et al. | |
| 2006/0034240 A1 | 2/2006 | Kwak et al. | |
| 2006/0034383 A1 | 2/2006 | Su et al. | |
| 2006/0045010 A1 | 3/2006 | Baker et al. | |
| 2006/0067413 A1 | 3/2006 | Tsai | |
| 2006/0072677 A1 | 4/2006 | Kwak et al. | |
| 2006/0128410 A1 | 6/2006 | Derryberry et al. | |
| 2006/0171342 A1 | 8/2006 | Dateki | |
| 2006/0193373 A1 | 8/2006 | Agee et al. | |
| 2007/0011550 A1 | 1/2007 | Agrawal et al. | |
| 2007/0140178 A1 | 6/2007 | Jung et al. | |
| 2007/0165739 A1 | 7/2007 | Hottinen et al. | |
| 2007/0171849 A1 | 7/2007 | Zhang et al. | |
| 2007/0183380 A1 | 8/2007 | Rensburg et al. | |
| 2007/0183384 A1 | 8/2007 | Kwak et al. | |
| 2007/0211656 A1 | 9/2007 | Kwak et al. | |
| 2007/0223618 A1 | 9/2007 | Jeong et al. | |
| 2007/0254661 A1 | 11/2007 | Chowdhury et al. | |
| 2007/0286261 A1 | 12/2007 | Molev-Shteiman | |
| 2008/0013610 A1 | 1/2008 | Varadarajan et al. | |
| 2008/0019307 A1 | 1/2008 | Tenny et al. | |
| 2008/0032630 A1 | 2/2008 | Kim et al. | |
| 2008/0037464 A1 | 2/2008 | Lim et al. | |
| 2008/0080634 A1 | 4/2008 | Kotecha et al. | |
| 2008/0101211 A1 | 5/2008 | Rao | |
| 2008/0151831 A1 | 6/2008 | Khan et al. | |
| 2008/0159323 A1 | 7/2008 | Rinne et al. | |
| 2008/0182582 A1 | 7/2008 | Bachl et al. | |
| 2008/0192696 A1 | 8/2008 | Sachs et al. | |
| 2008/0232234 A1 | 9/2008 | McCoy et al. | |
| 2008/0232300 A1 | 9/2008 | McCoy et al. | |
| 2008/0233964 A1 | 9/2008 | McCoy et al. | |
| 2008/0267310 A1 | 10/2008 | Khan et al. | |
| 2008/0287155 A1 | 11/2008 | Xu et al. | |
| 2008/0304593 A1 | 12/2008 | Khan et al. | |
| 2008/0310540 A1 | 12/2008 | Tiirola et al. | |
| 2008/0311911 A1 | 12/2008 | Koodli et al. | |
| 2009/0046672 A1 | 2/2009 | Malladi et al. | |
| 2009/0046774 A1 | 2/2009 | Abou Rjeily | |
| 2009/0046789 A1 | 2/2009 | Xu et al. | |
| 2009/0055703 A1 | 2/2009 | Kim et al. | |
| 2009/0073922 A1 | 3/2009 | Malladi et al. | |
| 2009/0097447 A1 | 4/2009 | Han et al. | |
| 2009/0109906 A1 | 4/2009 | Love et al. | |
| 2009/0168922 A1* | 7/2009 | Malladi et al. | 375/316 |
| 2009/0175233 A1 | 7/2009 | Ojala et al. | |
| 2009/0196240 A1 | 8/2009 | Frederiksen et al. | |
| 2009/0201863 A1 | 8/2009 | Pi | |
| 2009/0201904 A1 | 8/2009 | Lee et al. | |
| 2009/0238131 A1 | 9/2009 | Montojo et al. | |
| 2009/0245187 A1 | 10/2009 | Nam et al. | |
| 2009/0259909 A1 | 10/2009 | Luo | |
| 2009/0274037 A1 | 11/2009 | Lee et al. | |
| 2009/0290597 A1 | 11/2009 | Baumgartner et al. | |
| 2009/0303866 A1 | 12/2009 | Li et al. | |
| 2010/0220708 A1 | 9/2010 | Mantravadi et al. | |
| 2010/0284347 A1 | 11/2010 | Ahn et al. | |
| 2011/0142097 A1 | 6/2011 | Walton et al. | |
| 2011/0292900 A1* | 12/2011 | Ahn et al. | 370/329 |
| 2012/0033650 A1* | 2/2012 | Ahn et al. | 370/336 |
| 2012/0087363 A1 | 4/2012 | Jongren et al. | |

FOREIGN PATENT DOCUMENTS

| | | |
|---|---|---|
| EP | 1349292 | 10/2003 |
| EP | 1389848 | 2/2004 |
| EP | 1746855 | 1/2007 |
| EP | 1784036 | 5/2007 |
| EP | 1819088 | 8/2007 |
| JP | 2007028569 | 2/2007 |
| KR | 10-2002-0009079 | 2/2002 |
| KR | 10-2006-0092055 | 8/2006 |
| WO | 0176110 | 10/2001 |
| WO | 2004049613 | 6/2004 |
| WO | 2004051872 | 6/2004 |
| WO | 2005074312 | 8/2005 |
| WO | 2005/099103 | 10/2005 |
| WO | 2005099103 | 10/2005 |
| WO | 2005-114888 | 12/2005 |
| WO | 2005117319 | 12/2005 |
| WO | 2006/020339 | 2/2006 |
| WO | 2006129749 | 12/2006 |
| WO | 2006138337 | 12/2006 |
| WO | 2007015305 | 2/2007 |
| WO | 2007/066936 | 6/2007 |
| WO | 2007/092258 | 8/2007 |

OTHER PUBLICATIONS

Hyunseok Yu et al., "Transmit Selection Diversity Technique in the MIMO-OFDM Systems for HSDPA," 59th IEEE Vehicular Technology Conference, vol. 1, pp. 362-366, May 2004.

Lee, H., et al., "Novel Multi-User MIMO Scheme Based on Successive Interference Cancellation," IEEE International Symposium on Consumer Electronics, Jun. 20, 2007, XP031160370.

LG Electronics, "Allocation of UL ACK/NACK Index," 3GPP TSG RAN WG1#49, R1-072348, May 7, 2007, XP050106077.

LG Electronics, "PHICH Duration and Signaling," 3GPP TSG RAN WG1#50, R1-073476, Aug. 20, 2007, XP050107084.

Ericsson, "E-mail Summary Taking you Forward on Downlink Control Signaling," 3GPP TSG RAN WG1#50bis, R1-074369, Oct. 8, 2007, XP050107884.

Motorola, "PHICH Resource Signaling for TDD & FDD," 3GPP TSG RAN #51bis, R1-080433, Jan. 14, 2007, XP050108952.

Motorola, "PHICH Resource Signaling for TDD & FDD," 3GPP TSG RAN #52bis, R1-081286, Apr. 1, 2008, XP050109724.

Catt, et al., "Indication of PHICH Resource for TDD," 3GPP TSG RAN #52bis, R1-081326, Mar. 31, 2008, XP050109752.

Nokia, "Data-non-associated Control Signal Transmission with UL Data," 3GPP TSG RAN WG1 Meeting #48, R1-071000, Feb. 2007, XP-002573203.

3rd Generation Partnership Project (3GPP), "Technical Specification Group Radio Access Network; LTE Physical Layer—General Description (Release 8)," 3GPP TS 36.201 v0.11, R1-071252, Mar. 2007, XP-050105207.

LTE Rapporteur (NTT DoCoMo), "Text Proposal for TS 36.300 (Stage 2 TS)," 3GPP TSG RAN WG1 Meeting #48, R1-071251, Feb. 2007, XP-050105206.

Panasonic, "CQI Feedback Control and Content in E-UTRA", 3GPP TSG-RAN WG1 Meeting #49, R1-072077, May 7, 2007, XP050105831.

Motorola, "Search Space Definition for L1/L2 Control Channels," R1-072691, 3GPP TSG RAN1 #49bis, Jun. 2007.

Mitsubishi Electric, "UE and CCE specific scrambling codes for low complexity blind detection of downlink control signaling," R1-072063, 3GPP TSG RAN WG1 #49 meeting, May 2007.

Samsung, "UL reference signal multiplexing", R1-063257, 3GPP TSG RAN WG1 Meeting #47, Nov. 2006.

3RD Generation Partnership Project, "Technical Specification Group Radio Access Network; Evolved Universal Terrestrial Radio Access (E-UTRA) Radio Resource Control (RRC); Protocol specification (Release 8)", 3GPP TS 36.331, V8.0.0, Dec. 2007.

3RD Generation Partnership Project, "Technical Specification Group Radio Access Network; Evolved Universal Terrestrial Radio Access (E-UTRA); Radio Resource Control (RRC); Protocol specification (Release 8)", 3GPP TS 36.331, V8.14.0, Jun. 2011.

Bo Goransson et al., "Evolution of WCDMA high speed packet access and broadcast services", IEEE 8th Workshop on Signal Processing Advances in Wireless Communications (SPAWC), Jun. 2007, XP-031189506.

"Part 16: Air Interface for Broadband Wireless Access Systems", P802.16Rev2/D0b, pp. 1-1754, Jun. 2007, XP-017631176.

Nokia, "Data-non-associated control signal transmission with UL data", R1-071000, 3GPP TSG-RAN WG1 Meeting #48, Feb. 2007.

In the USPTO U.S. Appl. No. 12/669,441, Final Office Action dated Nov. 21, 2012, 30 pages.

\* cited by examiner

METHOD FOR ACQUIRING RESOURCE REGION INFORMATION FOR PHICH AND METHOD OF RECEIVING PDCCH

CROSS-REFERENCE TO RELATED APPLICATIONS

This application is a continuation of U.S. patent application Ser. No. 12/526,499, filed on Jul. 16, 2010, currently pending, which is a 371 U.S. national stage application of International Application No. PCT/KR2008/004754, filed on Aug. 14, 2008, which claims the benefit of earlier filing date and right of priority to Korean Patent Application No. 10-2008-0079740, filed on Aug. 14, 2008, and also claims the benefit of U.S. Provisional Application Ser. No. 60/955,863 filed on Aug. 14, 2007, the contents of which are all hereby incorporated by reference herein in their entirety.

TECHNICAL FIELD

The present invention relates to a method of acquiring location information of a resource region for transmitting a physical hybrid HARQ indicator channel (PHICH) in a mobile communication system and a method of receiving a physical downlink control channel (PDCCH) using the same.

BACKGROUND ART

In transmitting a packet in a mobile communication system, a receiver should inform a transmitter of a presence or non-presence of success of a packet reception. In case that the packet reception is successful, ACK is transmitted to enable the transmitter to transmit a new packet. In case that packet reception fails, NACK is transmitted to enable the transmitter to retransmit the corresponding packet. This operation is called ARQ (automatic request).

The ARQ operation can be combined with channel coding scheme. In particular, the above-mentioned ARQ is proposed as HARQ (hybrid ARQ) which raises efficiency of whole system in a manner of lowering an error rate by combining a retransmitted packet with a previously transmitted packet. In order to raise throughput of system, the HARQ is requested to receive an ACK/NACK response faster than that of the conventional ARQ operation from a receiver. Hence, ACK/NACK is transmitted by physical channel signaling in HARQ.

Implementations of HARQ can be categorized into two types. A first type is chase combining (CC), in which retransmission is performed using the same code bits by the same modulation scheme and coding rate as that of a previously packet. A second type is incremental redundancy (IP), in which retransmission is performed in a manner of allowing a transmission by using a modulation scheme and coding rate different from those of the previously transmitted packet. In this case, the receiver can raise the throughput of system through coding diversity.

In a multi-carrier cellular module communication system, user equipments belonging to one or a plurality of cells perform uplink data packet transmission to a base station. Since a plurality of user equipments are able to transmit uplink data packets within a single subframe, a base station should be able to transmit ACK/NACK signals to a plurality of the user equipments within the single subframe. In particular, in the 3GPP LTE system, a base station transmits ACK/NACK signals to a plurality of user equipments via a physical HARQ indicator channel (hereinafter abbreviated PHICH), and more particularly, via a channel for transmitting downlink ACK/NACK information for uplink HARQ.

In case that a base station multiplexes a plurality of ACK/NACK signals transmitted to user equipments within a single subframe by CDMA in a partial time-frequency domain of a downlink transmission band of a multi-carrier system, the multiplexed signals are discriminated from ACK/NACK signals for other user equipments by orthogonal or pseudo-orthogonal code multiplied through the time-frequency domain. Moreover, in case of performing QPSK transmission, the discrimination can be achieved through two different orthogonal phase components. In particular, a plurality of ACK/NACK signals are transmitted by being multiplexed by CDMA through a plurality of PHICHs in the 3GPP LTE system. And, a unit of the transmission through the multiplexing by CDMA is called 'PHICH group'.

Meanwhile, in case that a specific user equipment tries an initial access to a prescribed cell, the user equipment needs to acquire system information of the corresponding cell. Such basic information e.g. system bandwidth can be received via a physical broadcast channel (hereinafter abbreviated 'PBCH'). Yet, in order to acquire detailed system information from the system information of the corresponding cell, the user equipment is requested to receive a physical downlink shared channel (hereinafter abbreviated 'PDSCH') that is the channel for transmitting general downlink data.

In this case, scheduling information of PDSCH is transmitted via PDCCH of each subframe. A user equipment in progress of an initial access receives PBCH and then receives PDCCH of a specific subframe. Hence, the user equipment is able to know scheduling information on PDSCH transmitting detailed system information through that subframe. In this case, in order to receive the PDCCH having the scheduling information about the PDSCH transmitting the detailed system information, a transmission location of the corresponding PDCCH should be known.

Since PDCCH is generally mapped to RE (Resource Element) except RE(s) for carrying PHICH and other control signals, it should be checked how the PHICH and other control signals are mapped to a resource region to receive the PDCCH.

DISCLOSURE OF THE INVENTION

Technical Problem

Technical Solution

Accordingly, the present invention is directed to a method of acquiring resource region information for PHICH in a mobile communication system and a method of receiving a physical downlink control channel (PDCCH) using the same that substantially obviate one or more of the problems due to limitations and disadvantages of the related art.

An object of the present invention is to provide a method of acquiring resource region information for PHICH in a mobile communication system and a method of receiving a physical downlink control channel (PDCCH) using the same, by which location information of a resource region for transmitting PHICH is efficiently transferred and by which an initial access user equipment is facilitated to receive PDCCH.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of acquiring PHICH transmission resource region information, in which a user equipment (UE) acquires resource region information for transmitting PHICH (physical hybrid ARQ indicator channel), according to the present invention includes the steps of, receiving a PBCH (physical broadcast channel), and acquiring the resource region information for transmitting the PHICH according to information of the received PBCH, wherein the resource region for transmitting the PHICH is determined according to a first information corresponding to the number (N) of PHICH per subframe and a second information corresponding to a duration (m) of the PHICH per subframe, wherein the first information is determined as a value resulting from multiplying a basic number predetermined according to a system bandwidth by a specific constant, and wherein the specific constant is acquired from the information of the received PBCH.

To further achieve these and other advantages and in accordance with the purpose of the present invention, a method of receiving a PDCCH, in which a user equipment (UE) receives a physical downlink control channel (PDCCH), includes the steps of receiving a PBCH (physical broadcast channel), acquiring resource region information for transmitting a PHICH (physical hybrid ARQ indicator channel) according to information of the received PBCH, and receiving the PDCCH according to the resource region information for transmitting the PHICH, wherein the resource region for transmitting the PHICH is determined according to a first information corresponding to the number (N) of PHICH per subframe and a second information corresponding to a duration (m) of the PHICH per subframe, wherein the first information is determined as a value resulting from multiplying a basic number predetermined according to a system bandwidth by a specific constant, and wherein the specific constant is acquired from the information of the received PBCH.

Preferably, the first information includes either number information of the PHICH per subframe or number information of PHICH group per subframe. Preferably, the second information is acquired from the information of the received PBCH.

More preferably, the PBCH includes signaling information for indicating the duration (m) information of the PHICH per subframe. In this case, the signaling information can have a 1-bit length. More preferably, the specific constant includes one selected from the group consisting of ⅙, ½, 1 and 2.

Preferably, the PDCCH is received a resource region except the resource region for transmitting the PHICH within a prescribed OFDM symbol interval from a first OFDM symbol of each subframe and the PDCCH receiving step includes the step of enabling the user equipment to decode the resource region except the resource region for transmitting the PHICH within the prescribed OFDM symbol interval as a PDCCH search region.

To further achieve these and other advantages and in accordance with the purpose of the present invention, a method of transferring PHICH (physical hybrid ARQ indicator channel) transmission resource region information, includes the step of transmitting a PBCH (physical broadcast channel) including specific constant information, wherein the resource region for transmitting the PHICH is determined according to a first information corresponding to the number (N) of PHICH per subframe and a second information corresponding to a duration (m) of the PHICH per subframe and wherein the first information is determined as a value resulting from multiplying a basic number (e.g., a basic PHICH number or a basic PHICH group number) predetermined according to a system bandwidth by the specific constant.

Preferably, the first information includes either number information of the PHICH per subframe or number information of PHICH group per subframe. Preferably, the PBCH includes signaling information for indicating the second information.

It is to be understood that both the foregoing general description and the following detailed description are exemplary and explanatory and are intended to provide further explanation of the invention as claimed.

Advantageous Effects

According to the above-described embodiments of the present invention, location information of a resource region for transmitting PHICH is efficiently transferred and an initial access user equipment is facilitated to receive PDCCH.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings.

Figure 1:
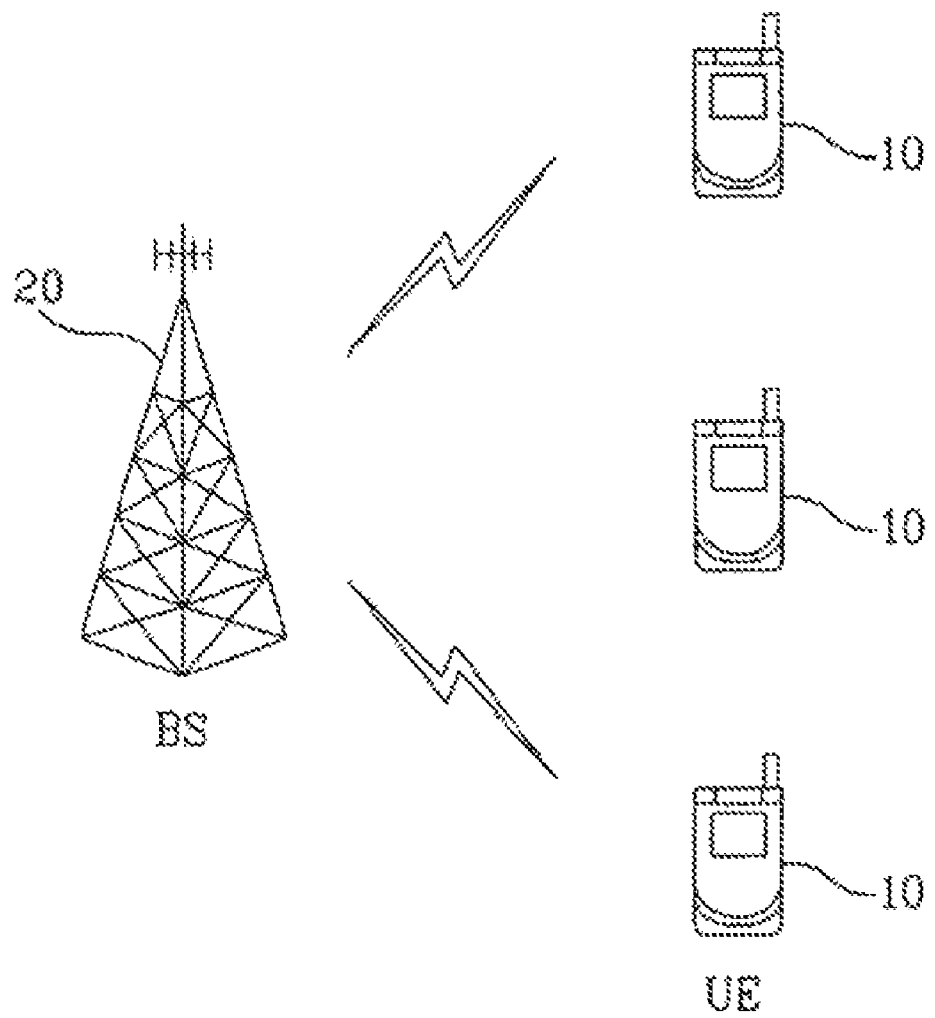
FIG. 1 is a block diagram of a wireless communication system.

FIG. 1 is a block diagram of a wireless communication system.

A wireless communication system is widely deployed to provide various communication services including voice, packet data and the like. Referring to FIG. 1, a wireless communication system includes a user equipment (UE) 10 and a base station (BS) 20. The user equipment 10 is fixed or can have mobility. And, a terminal can be called such a terminology as a user equipment (UE), a mobile station (MS), a user terminal (UT), a subscriber station (SS), a wireless device and the like. The base station 20 generally means a fixed station and can be called such a terminology as a node B (NodeB), a base transceiver system (BTS), an access point and the like. And, at least one cell can exist for a single base station 20.

The wireless communication system can be an OFDM/OFDMA (orthogonal frequency division multiplexing/orthogonal frequency division multiple access) based system. The OFDM uses a plurality of orthogonal subcarriers. The OFDM uses orthogonal characteristic between IFFT (inverse fast Fourier transform) and FFT (fast Fourier transform). A transmitter transmits data by performing IFFT. A receiver reconstructs original data by performing FFT on a received signal. The transmitter uses IFFT to combine multiplexed subcarriers. And, the receiver uses corresponding FFT to separate the multiplexed subcarriers.

The present invention is intended to provide a method of efficiently transferring location information of a resource region for transmitting PHICH in the above-described wireless communication system and a method of facilitating an initial access user equipment to receive PDCCH using the same. For this, how to specify a resource region for transmitting PHICH is explained in the first place as follows.

First of all, in the 3GPP LTE system, PHICH is transmitted via first m OFDM symbols among OFDM symbols of each subframe, where m≧1. And, PHICH and other control signals are transmitted via specific resource elements (REs) within first n OFDM symbols of the corresponding subframe, where n≧m. Meanwhile, PDCCH is transmitted via REs except the former REs for carrying the above-mentioned PHICH and other control signals within the n OFDM symbols of the subframe. Hence, in order to receive scheduling information via the PDCCH of each subframe, the user equipment should know how PHICHs are mapped to the corresponding subframe.

Resource region mapping of PHICH in each subframe of each cell can be determined by two factors including information corresponding to an N value that is the number of PHICHs existing in the corresponding subframe and information corresponding to an m value that is the number of OFDM symbols having the PHICH mapped thereto in the subframe. In this case, the number of the OFDM symbols having the PHICH mapped thereto can be names a "PHICH duration". Hence, the user equipment should know the two factors to receive the PDCCH of each subframe.

Meanwhile, the PHICH group means a set in which PHICHs are multiplexed by CDMA. In particular, a plurality of PHICHs mapped to a same resource element (RE) set construct a PHICH group. In this case, the PHICHs within the PHICH group can be discriminated from each other by different orthogonal sequences, respectively. If the number of the PHICH groups is represented as $G_N$, the following relation with the number N of PHICHs is established.

$$N = G_N * C \quad \text{[Formula 1]}$$

In Formula 1, 'C' indicates the number of orthogonal or pseudo-orthogonal codes used for multiplexing by CDMA. Since a value of C can be determined fixed according to a system environment, it is able to obtain the number N of PHICHs according to the number $G_N$ of the PHICH groups. Hence, the information corresponding to the number N of the PHICHs per subframe can be the value N itself or the value $G_N$.

In brief, a location of a resource region for transmitting PHICH can be determined by the number N of PHICHs per subframe or the per-subframe PHICH group information (hereinafter named; first information') corresponding to the number N and the OFDM symbol number value m (hereinafter named 'second information') having the PHICH per subframe mapped thereto. In case that the transmission resource region location of the PHICH is determined based on the above information, it is able to determine a location of the transmission resource region of the PDCCH.

FIGS. 2A to 2D are exemplary diagrams to explain the concept of a resource region location for transmitting PHICH and corresponding PDCCH transmission position according to first information and second information.

Figure 2A:
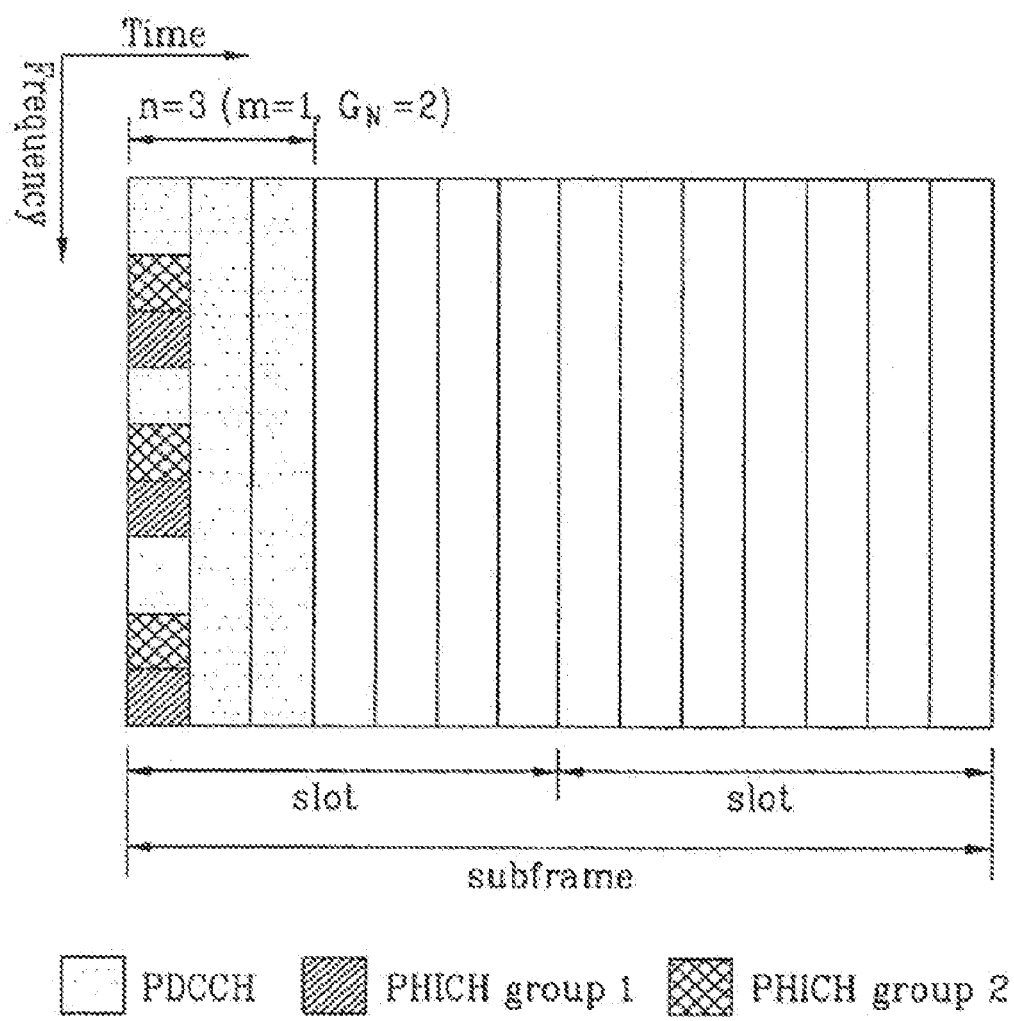
FIGS. 2A to 2D are exemplary diagrams to explain the concept of a resource region location for transmitting PHICH and corresponding PDCCH transmission position according to first information and second information.
Figure 2B:
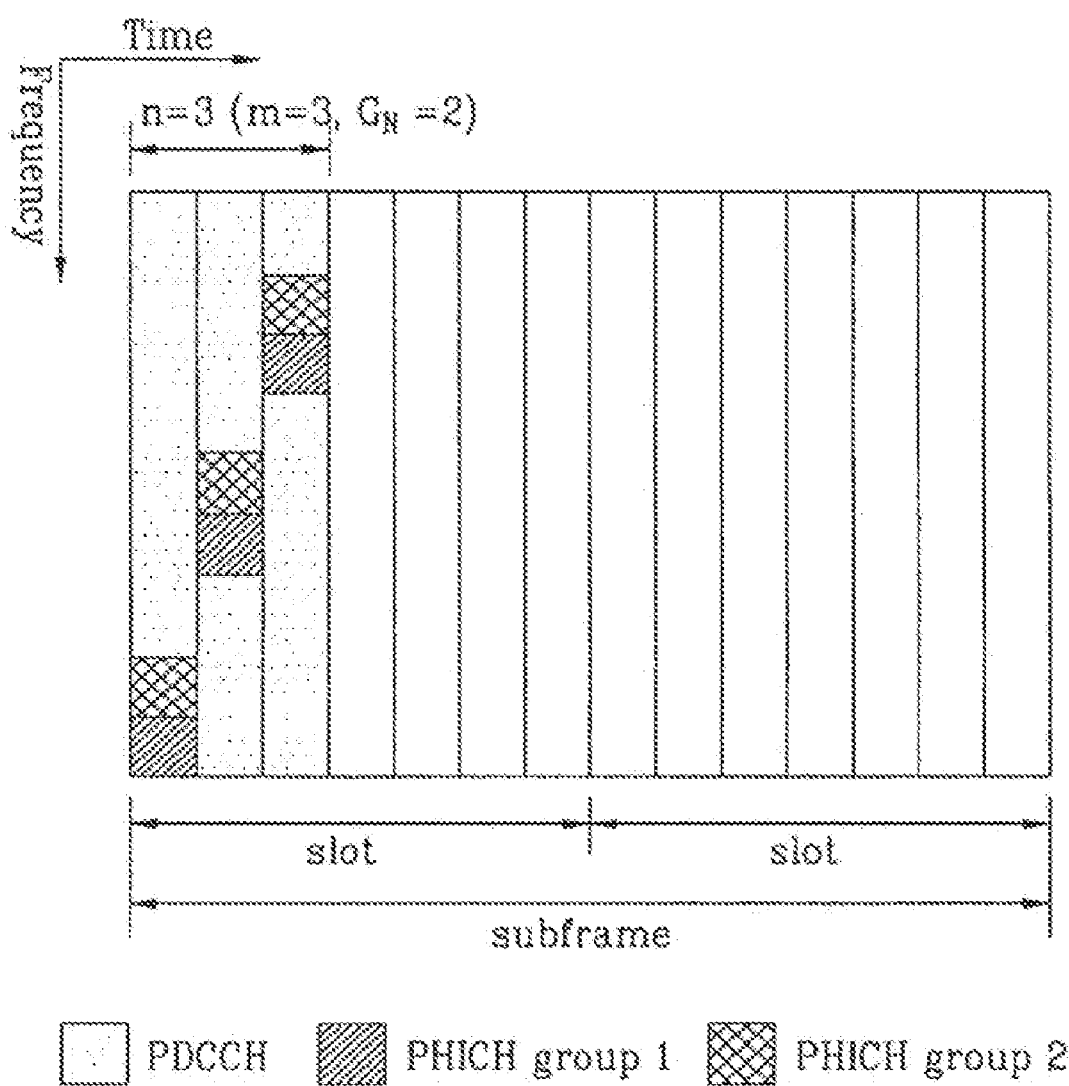
Figure 2C:
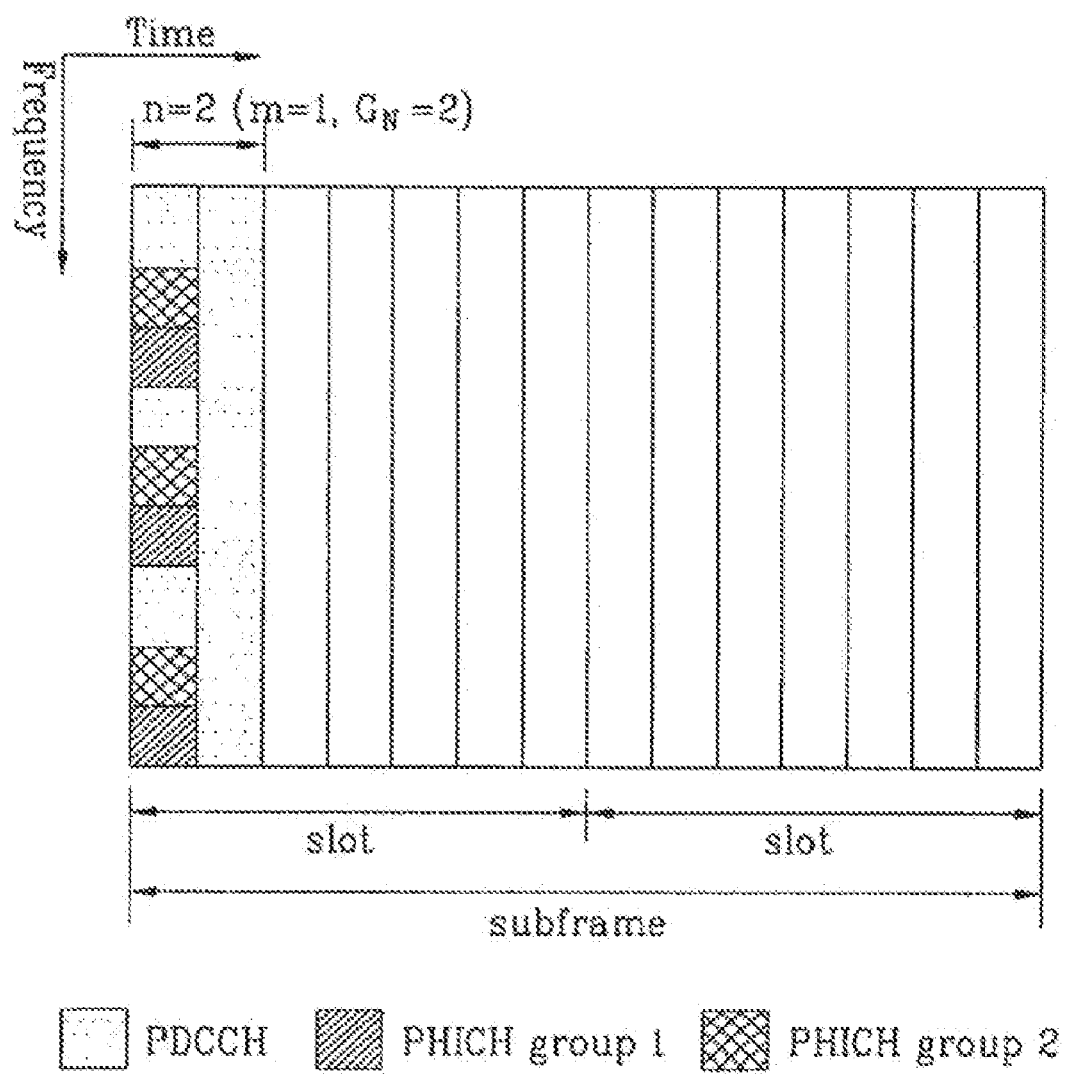
Figure 2D:
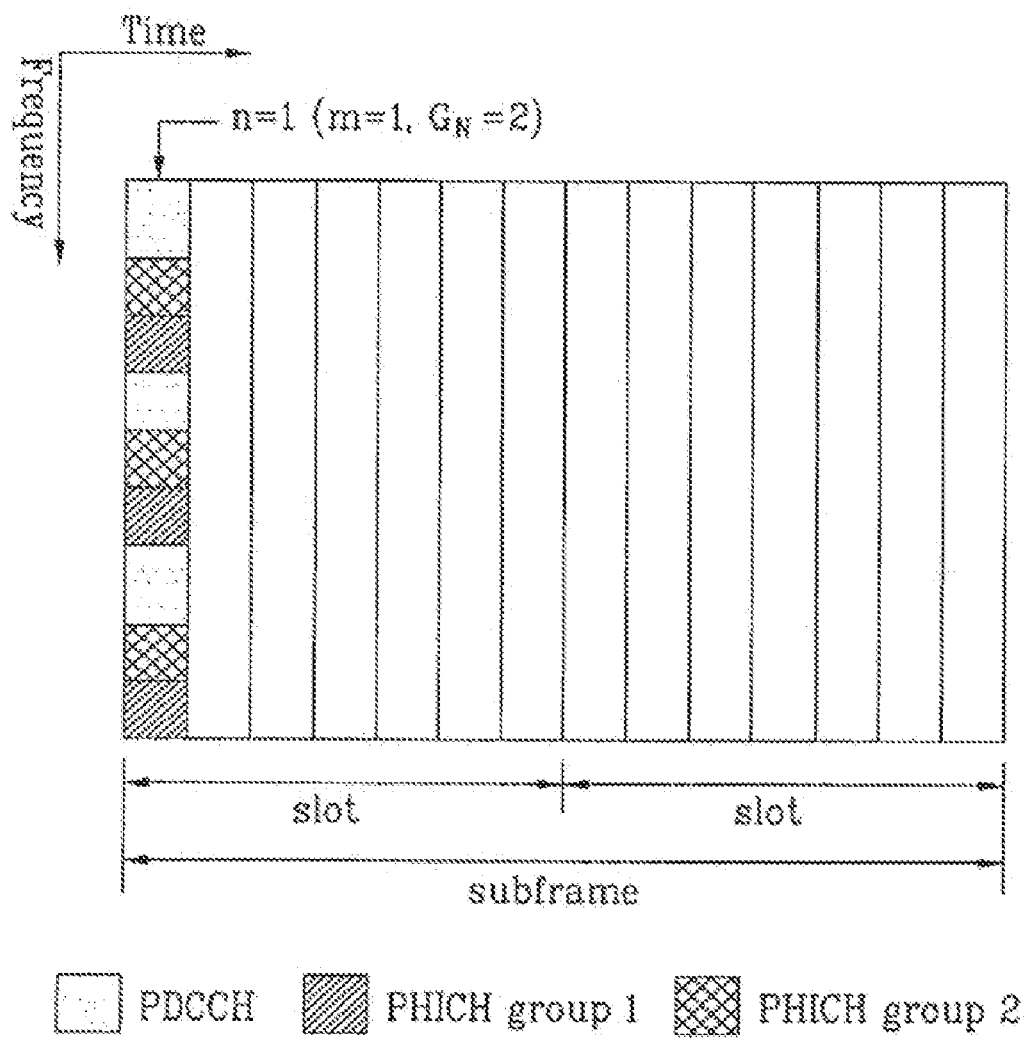

In FIG. 2A and FIG. 2B, shown are the case that a PHICH duration m is 1 or 3 in case that an OFDM symbol interval n for control information transmission within a subframe is 3 and that the number $G_N$ of PHICH groups is 2. FIG. 2C and FIG. 2D show the case of m=1 and $G_N$=2 in case that n is 2 or 1. Referring to FIGS. 2A to 2D, if the first information such as N or $G_N$ and the second information corresponding to m are specified, a resource region for transmitting PHICH can be obtained according to a predetermined pattern. Hence, it is able to obtain a position for transmitting PDCCH within an OFDM symbol region within a range of n.

In the following description of an embodiment, a method of announcing the first and second information efficiently is explained. Prior to looking into the method of transferring the PHICH transmission region information efficiently, it is necessary to review the relation between information required for a reception of each channel.

Figure 3:
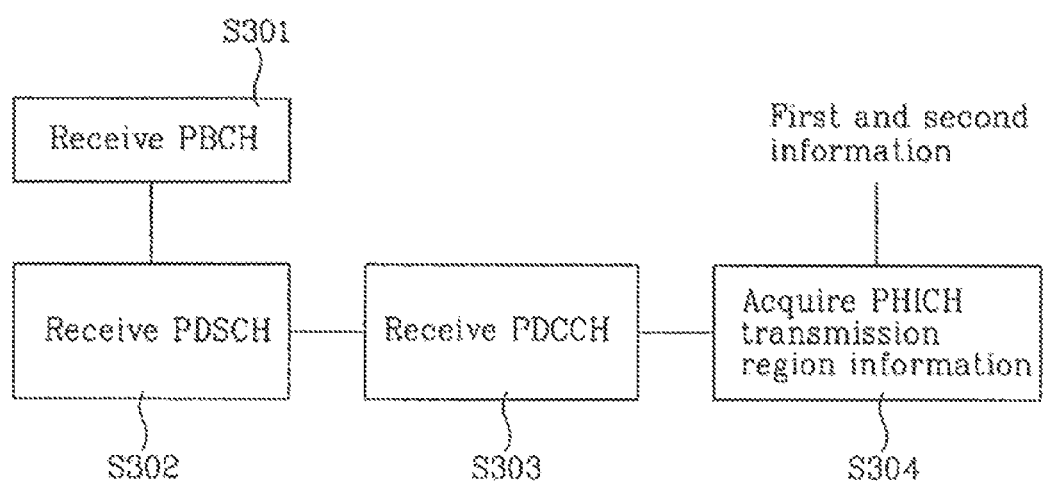
FIG. 3 is a conceptional diagram to explain information relation to enable an initial access user equipment to receive PDSCH.

FIG. 3 is a conceptional diagram to explain information relation to enable an initial access user equipment to receive PDSCH.

First of all, an initial access user equipment is able to acquire basic system information by receiving PBCH [S301]. Yet, as mentioned in the foregoing description, in order to acquire detailed system information, a reception of PDSCH is necessary [S302]. Meanwhile, since scheduling information of the PDSCH is transmitted via PDCCH of each subframe, for the PDSCH reception [S302], a reception [S303] of the PDCCH is necessary. Besides, since the PDCCH, as shown in FIG. 2, is transmitted via a region except the transmission region of the PHICH and other control information within the n-OFDM symbol range of each subframe, acquisition [S304] of information on the PHICH transmission region within the subframe is necessary.

Meanwhile, the PHICH transmission region, as mentioned in the foregoing description with reference to FIG. 2, can be determined via the first information and the second information.

It can be observed from FIG. 3 that the initial access user equipment is facilitated to acquire the first information and the second information in a manner of transmitting the first and/or second information via PBCH. Therefore, a method of transmitting first information via PBCH according to one embodiment of the present invention is proposed. In case that the first information is transmitted via PBCH, the transmitted information can correspond to the number N of PHICHs per subframe or the PHICH group number $G_N$.

Meanwhile, a method of determining first information according to a system bandwidth in advance is available as well. For instance, in case that L RBs (resource blocks) exist within a system band of a prescribed cell, PHICH information on a data transmission via each of the RBs can be transmitted in downlink. In this case, L PHICHs corresponding to the RB number within the system band can be set to a basic N in each downlink subframe. If so, it is unnecessary to transmit a value of the N to a user equipment separately. Alternatively, by defining the $G_N$ value corresponding to the number of PHICH groups instead of the N value, the same effect as defining the N value can be obtained.

In this case, the following items can be taken into consideration. For instance, in case that multi-user MIMO transmission or single-user MIMO transmission is possible in uplink, the number of necessary downlink PHICHs can be incremented into the multiplications amounting to a difference possible for spatial multiplexing in uplink. When data are transmitted in uplink via several RBs, it is unnecessary to transmit PHICH information on all RBs in downlink. Hence, the number of PHICHs may be decremented. Therefore, another embodiment of the present invention proposes a method of determining the number of basic PHICHs determined in advance according to a system bandwidth (or the basic PHICH group number) and then announcing a ratio of the number of the basic PHICHs (or the basic PHICH group number) to the number of real PHICHs (or the real PHICH group number) via PBCH, instead of transmitting the first value via PBCH in direct.

For instance, assume that the basic PHICH group number is determined in advance according to a system bandwidth and assume that a constant corresponding to a ration of the basic PHICH group number to the real PHICH group number is transferred via PBCH. Generally, a PHICH group indicates PHICHs mapped to the same resource element set by orthogonal code. In case of the 3GPP LTE system, the number of PHICHs mapped to a single PHICH group can be 8 or 4. In particular, in case of using a general CP, eight PHICHs can be mapped to a single PHICH group. In case of using an extended CP, four PHICHs can be mapped to a single PHICH group.

For instance, assuming that a downlink bandwidth indicated by a frequency domain RB unit in a subframe using a general CP is set to $N_{RB}^{DL}$, the number of PHICH groups can be represented as Formula 2 or Formula 3.

$$G_N = a\lceil N_{RB}^{DL}/8 \rceil \quad \text{[Formula 2]}$$

$$G_N = \lceil a \cdot N_{RB}^{DL}/8 \rceil \quad \text{[Formula 3]}$$

In Formula 2 and Formula 3, $\lceil x \rceil$ indicates an integer equal to or greater than x. In Formula 2 and Formula 3, 'a' is a constant corresponding to a ratio the basic PHICH group number ($\lceil N_{RB}^{DL}/8 \rceil$ or $N_{RB}^{DL}/8$) determined in advance according to a system bandwidth to the real PHICH group number GN and is assumed as transmitted via PBCH in the present embodiment. For instance, the 'a' can be one of ⅙, ½, 1 or 2. Yet, the 'a' may correspond to another value according to a system requirement. Moreover, Formula 2 and Formula 3 are exemplary for the case of using the general CP. In case of using the extended CP, two times of the basic PHICH group number can be used for the calculation of the real PHICH group number $G_N$.

Meanwhile, in order to secure a PDCH transmission position, second information corresponding to a PHCH duration m needs to be secured as well as first information corresponding to the PHICH transmission number N or the PHICH group number $G_N$.

According to one embodiment of the present invention for the second information, proposed is a method of transferring the second information via signaling information of PBCH like the first information. If a value m, as shown in FIG. 2, is set to either 1 or 3, it is able to transfer the second information to a user equipment via 1-bit signaling of PBCH. Moreover, it is able to set to indicate that the value m corresponds to either 1 or 2 via the same 1-bit signaling as well.

According to another embodiment of the present invention, proposed is a method of defining a value m to be determined in advance according to a value N per bandwidth in case that the number (value N) of PHICH allocation varies within a single bandwidth. For instance, in case that the value N is allocated different as 1 to 50 in a system having a bandwidth of 10 MHz, if a value N is equal to or greater than 1 and equal to or smaller than 25, it is able to define m=1 in advance. If the value N is equal to or greater than 26 and equal to or smaller than 50, it is able to define m=2 in advance. If so, a user equipment is able to know a value m through the value N without transmitting a value m separately.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of transferring PHICH transmission resource region information and a PDCCH receiving method using the same according to the respective embodiments of the present invention is applicable to the 3GPP LTE system. Yet, the principle for a user equipment applied to the present invention to receive each channel information and the principle for acquiring information necessary for the same are applicable to other wireless communication systems.

What is claimed is:

1. A method for a user equipment (UE) to receive system information from a base station, the method comprising:
   receiving a PBCH (physical broadcast channel) comprising first system information from the base station, wherein the first system information comprises system bandwidth information and PHICH (physical hybrid ARQ indicator channel) related information, wherein the PHICH related information comprises first information associated with a number ($G_N$) of PHICH group and second information associated with a PHICH duration (m), wherein multiple PHICHs mapped to the same set of resource elements constitute a PHICH group;
   receiving a PDCCH (Physical Downlink Control Channel) comprising control information from the base station via a first resource region excluding a second resource region assigned to the PHICH, wherein the second resource region assigned to the PHICH is based on the first information and the second information; and
   receiving a PDSCH (Physical Downlink Shared Channel) comprising second system information from the base station via a third resource region, wherein the third resource region is determined based on the control information of the PDCCH.

2. The method of claim 1, wherein the first system information is for basic system information of a cell of the UE, and the second system information is for detailed system information other than the basic system information.

3. The method of claim 1, wherein the system bandwidth information is used to determine the number ($G_N$) of PHICH group based on the received first information.

4. A method for a base station to transmit system information to a user equipment (UE), the method comprising:
   transmitting a PBCH (physical broadcast channel) comprising first system information to the UE, wherein the first system information comprises system bandwidth information and PHICH (physical hybrid ARQ indicator channel) related information, wherein the PHICH related information comprises first information associated with a number ($G_N$) of PHICH group and second information associated with a PHICH duration (m), wherein multiple PHICHs mapped to the same set of resource elements constitute a PHICH group;
   transmitting a PDCCH (Physical Downlink Control Channel) comprising control information to the UE via a first resource region excluding a second resource region assigned to the PHICH, wherein the second resource region assigned to the PHICH is based on the first information and the second information; and transmitting a PDSCH (Physical Downlink Shared Channel) comprising second system information to the UE via a third resource region, wherein the third resource region is determined based on the control information of the PDCCH.

5. The method of claim 4, wherein the first system information is for basic system information of a cell of the base station, and the second system information is for detailed system information other than the basic system information.

6. The method of claim 4, wherein the system bandwidth information is used to determine the number ($G_N$) of PHICH group based on the received first information.

* * * * *